(12) United States Patent
Hanazawa et al.

(10) Patent No.: US 6,501,645 B1
(45) Date of Patent: Dec. 31, 2002

(54) MAGNETIC DISK DRIVE WITH UNIQUE CABLE WIRING SCHEME AND ELECTRONIC DEVICE USING THE SAME

(75) Inventors: Shigeyuki Hanazawa, Odawara (JP); Masahiko Sega, Hiratsuka (JP); Toshiaki Kojima, Odawara (JP); Yasuhiro Matsuda, Ishioka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/618,942

(22) Filed: Jul. 18, 2000

(30) Foreign Application Priority Data

Jan. 13, 2000 (JP) ........................................ 2000-009975
Jun. 8, 2000 (JP) ........................................ 2000-177138

(51) Int. Cl.[7] .................................................. G06F 1/16
(52) U.S. Cl. ........................ 361/685; 361/683; 248/632
(58) Field of Search ............................ 361/679, 684, 361/685, 686; 248/632, 634, 636, 638, 610, 611, 614, 645, 672, 673; 360/97.01, 97.02, 97.03, 97.04, 98.01, 103–106

(56) References Cited

U.S. PATENT DOCUMENTS

| 4,980,786 A | * | 12/1990 | O'Sullivan et al. ....... 360/97.03 |
| 5,216,558 A | | 6/1993 | Griffith et al. |
| 5,299,944 A | | 4/1994 | Larabell et al. |
| 5,539,595 A | * | 7/1996 | Beck et al. .............. 360/97.01 |
| 5,623,381 A | | 4/1997 | Sawada et al. |
| 5,740,011 A | * | 4/1998 | Kobayashi et al. ......... 361/685 |
| 5,757,580 A | | 5/1998 | Andress et al. |
| 5,761,033 A | * | 6/1998 | Wilhelm ................... 361/686 |

FOREIGN PATENT DOCUMENTS

| EP | 0 306 715 A1 | 3/1989 |
| EP | 0 869 500 A2 | 10/1998 |
| GB | 2 342 759 A | 4/2000 |

* cited by examiner

Primary Examiner—Darren Schuberg
Assistant Examiner—Yean-Hsi Chang
(74) Attorney, Agent, or Firm—Antonelli, Terry, Stout & Kraus, LLP

(57) ABSTRACT

When supporting an HDA including an H/DA and an electronic control circuit board for controlling the same in a fixed frame (drive bay) of upper level apparatus by means of elastic or "soft" fixation, counterforce of an FPC cable gives it bad influence. When rigidly securing the HDA in a translational motion direction while attaining soft fixation in a direction of rotation, the HDA is rotatably supported with its center of gravity being as the center of rotation in a soft secure/support mechanism as taught from Published Japanese Patent Application No. 8-161880 (JP-A-8161880) for example; however, in the case of employing one of commercially available general purpose HDAs, this is disposed so that a bent or curved portion of its cable is identical in position to the rotation center or placed at a nearby location of the gravity center to thereby preclude the stiffness of an FPC cable hardly affects such rotatable support mechanism. This makes it possible to minimize creation of a torque posing a bar to free rotation of the HDA, which in turn enables mounting of the general purpose HDA thereby permitting wide spread of soft securing techniques. It is possible to facilitate popularization of a scheme for mounting a magnetic disk drive into portable or mobile equipment.

6 Claims, 12 Drawing Sheets

MAGNETIC DISK DRIVE WITH UNIQUE CABLE WIRING SCHEME AND ELECTRONIC DEVICE USING THE SAME

FILED OF THE INVENTION

The present invention relates generally to mounting structures of fixed or hard disk assembly ("HDA") for use with magnetic disk drive units, and more particularly to a cable layout technique therefor.

BACKGROUND OF THE INVENTION

Magnetic disk drives have been widely employed as external data storage units of modern computers. When magnetic disk drives are used in the form of unitary components, a single magnetic disk drive is accommodated within the interior of a personal computer as its storage module for example (as a logical equipment drive "C" in most cases). The same goes with other cases where it is used as a storage device adaptable for use in copying machines, land vehicle travel route guidance systems also known as "car navigation systems," portable or "mobile" computers, electronic cameras, and other electronic devices.

On the contrary, large size computers, called main frames, are designed to employ external storage apparatus including redundant arrays of inexpensive disk (RAID) systems with a plurality of magnetic disk drives packed in a box-like housing and/or large-capacity magnetic disk devices. These magnetic disk devices (such as RAIDs and mass-storage disk devices) will be collectively called the magnetic disk devices of the broad sense hereafter in the description. One typical approach to mounting for installation such magnetic disk devices of broad sense is to settle around a unitary magnetic disk drive (magnetic disk device of the narrow sense or alternatively HDA) a vibration-absorptive or anti-vibration support mechanism capable of withstanding vibration and shocks as externally applied thereto.

An HDA support structure for exclusive use in RAID systems or mass-storage magnetic disk devices is disclosed in JP-A-8-161880 (and its corresponding U.S. Pat. No. 5,740,011) under the name of the same applicant. Typically a magnetic disk device of the narrow or strict sense, HDA, is structured from two major parts: a mechanical part including magnetic disk storage media and more than one magnetic read/write head (referred to as a head/disk assembly or simply "H/DA" hereinafter), and electronic circuitry part (referred to hereafter as electronic control circuit board) for use in controlling the mechanical part.

A standard H/DA is designed to include an arm that is swingably movable with a pivot as its center, a magnetic head provided at the distal end of such arm, a rotatable magnetic disk media, an actuator for positioning the magnetic head at a desired location over the magnetic disk media, and an enclosure housing with its sealed interior space in which the above components are disposed. And, the H/DA is secured via a support mechanism to a fixed frame or fixation section of substantially rectangular shape (so-called drive bay within an upper-level device in the case of the magnetic disk device of the narrow sense).

Further, since the H/DA is designed so that its arm's center of gravity is identical in position to a layout position of the pivot, any vibration and shocks as externally applied thereto to give the H/DA translational movement will no longer serve as disturbance with respect to position determination of the magnetic head involved. However, such vibration/shock application can result in occurrence of disturbance relative to magnetic head positioning in cases where moment components about the magnetic disk media's rotary shaft and actuator's rotation axis are included in such vibration or the like. It is thus required that the support mechanism for rigidly attaching the H/DA to its associative fixed frame is free from the risk of disturbance with respect to the positioning procedures of the magnetic head within the H/DA upon externally applying of vibration that would result in the fixed frame exhibiting translational motion. More precisely, it should be required that the position of the gravity center of the HDA be taken into consideration when attaching to the fixed frame the HDA including both the H/DA and the electronic control circuit board operatively associated therewith. Note here that the HDA's gravity center position and the H/DA's gravity center position may be substantially the same as each other in intended meaning and definition, depending on the mass of the electronic control circuit board.

On the other hand, it is deemed convenient to employ commercially available general purpose products or "after-market" items as the magnetic disk devices of narrow sense when mounting them into electronic equipment of interest. In addition, if it is permissible to employ HDAs of after-market items for RAIDs or large-size mass-storage disk devices, then production costs decrease in the resultant systems. Here, the HDAs of after-market items may refer to those magnetic disk drives of the form factor type with adaptability to several kinds of interface standards such as the integrated drive electronics (IDE), enhanced IDE (EIDE), small computer system interface (SCSI) and others, including but not limited to 3.5-inch type, 2.5-inch type, 1.8-inch type, and so forth. Also note that an after-market HDA product is provided with an electronic control circuit board operatively associated with the H/DA, which is connected to upper-level apparatus via a cable and a connector placed at an end portion of the H/DA.

While the prior art structure as taught by the above-identified Japanese document JP-A-8-161880 employs its special-purpose or "dedicated" HDA, it has been found by the inventors as named herein that an attempt to replace this dedicated HDA with a mere general purpose HDA of after-market item can result in occurrence of inconvenience. More specifically, in view of the fact that the dedicated HDA comes with its own electronic circuitry as internally built therein, a specially designed cable wiring structure of the exclusive use type is used for transferring electrical signals from the H/DA to the electronic control circuit board—in this case, such wiring structure did not affect in any way the behavior of an actuator as internally disposed in the H/DA. However, when an attempt is made to apply an HDA of after-market item in place of the dedicated HDA to a fixed frame that has been used for mounting of the dedicated HDA, extra cable wiring/routing schemes are required due to the necessity of separately converting the signals from the after-market HDA product into appropriate signals suitable for use therein. Another problem faced with the prior art lies in an inability to provide any sufficient spatial margins for accommodation of the support mechanism that is used to increase stiffness or robustness against vibration and/or shocks occurring due to rotation of the H/DA. Letting the fixed frame decrease in thickness in a way suited for the size of an HDA of after-market item would result in occurrence of bad influence upon the behavior of the actuator settled within the H/DA. In short, it has been found by the inventors that presently available FPC cables offer increased stiffness along the width and are thus incapable of being directly applied for use at narrow spaced locations.

It is estimated that the above-noted bad influence does not take place in the structure as disclosed in the JP-A-8-161880 because the use of its dedicated H/DA and the specially designed electronic control circuit board in combination permits achievement of any desired cable wiring and routing without suffering from limitations thereto. In other words, even where a cable is disposed in a narrow space defined within the fixed frame while being curved or folded at its one or several portions as shown in FIG. 23, the cable's counterforce hardly affects the dedicated H/DA's rotary support mechanism. The electronic control circuit board and the H/DA are separately attached in a way independent of each other; during this process, electrical connection between the HDA and the fixed frame did not affect the behavior of the actuator within the H/DA.

A currently available general purpose 3.5-inch form factor type H/DA and its associated electronic control circuit board for use in controlling this H/DA are typically integrated together while causing a connector for transmission of electrical signals toward the outside of the HDA to be directly secured to either one of the H/DA and the electronic control circuit board. In addition, the dimensions of the magnetic disk drive as a whole and the interface are designed to meet a prespecified specification (i.e. interface satisfying the existing standard, such as IDE, EIDE, SCSI, or the like). Due to this, when applying a general purpose HDA of after-market item to the architecture as disclosed in JP-A-8-161880 for achievement of further popularization, it should be required to avoid two problems which follow:

1) The use of an HDA of after-market item would result in that its connector restricts or limits the selectability of interface type while precluding free designing of connector position. To avoid this problem, careful consideration should be given to electrical connection between the HDA and a fixed frame having either terminals or a printed circuit board for access thereto. More practically, "special" system design activities are required to attain the intended routing of a cable for electrical interconnection.

2) The use of a known technique for fixation to the upper-level apparatus's drive bay using screw holes as provided in a general purpose HDA results in the HDA being rigidly fastened to a fixed frame, which is insufficient in remedy for externally attendant vibration and shocks. To avoid this problem, an elastic or "soft" fixation technique must be applied without accompanying penalties, which technique is for achieving supportability with rotatability or with relative resiliency against spin motion and/or rotation shocks about a certain axis of rotation rather than translational external force being applied to the HDA, in a way as disclosed in JP-A-8-161880. It is also a must to design in such a way as to eliminate bad influence upon the soft fixation otherwise occurring due to cable routing while simultaneously leaving within the interior of a drive bay an extra space margin for accommodation of a soft fixation mechanism therein.

Here, the term rigid or "hard" fixation is to be understood to mean the fixation based in principle on elastic deformation of metals for engagement together—for instance, securing a target body to a metallic member using metal screws with metal washers intervening therebetween during screwing. In this respect, it should be understood that the hard fixation is also established even when the member used is partly made of hard materials other than metals, such as glass or ceramic material.

On the contrary, the soft fixation as used herein may refer to a technique for securing an object by screwing with use of elastic washers and/or resilient members as disposed adjacent to screw holes, or alternatively a structure for rotatably or relatively resiliently supporting an object with respect to rotary motion and/or spin shocks about a certain axis of rotation.

SUMMARY OF THE INVENTION

It is therefore an object of the present invention to provide a support mechanism for use with an HDA of a general purpose product capable of retaining resistivities against vibration and impact shocks of prior art RAID systems and large size magnetic disk apparatus while at the same time reducing production costs thereof.

It is another object of this invention to provide an HDA support mechanism capable of improving vibration/shock resistivities of electronic equipment mounting therein an HDA without lowering the accuracy of position alignment of a magnetic head within an H/DA and also without requiring any physical and electrical alternations to such electronic equipment.

It is a further object of the invention to apply the technique as disclosed in JP-A-8-161880 while employing an HDA of general-use product without degrading the positioning accuracy of a magnetic head within its H/DA and also without requiring physical and electrical alternations to electronic equipment mounting the HDA therein.

A specific structure is provided for use in disposing a curved portion of a cable for transmission of electrical signals from an HDA of commercially available general-use product, which portion can affect rotation of a rotatably supported HDA, in such a manner as to be identical with the position of the center of gravity of the HDA (in other words, a position of the rotation center) while letting either HDA or H/DA be attached to a fixed frame so that it is rotatable about the center of gravity thereof. Disposing is done in a way such that provision of a marginal space between a cable and the fixed frame precludes creation of counterforce occurring due to friction between the cable and fixed frame. In addition, through special designing of the shape of a cable for use in transferring electrical signals from the HDA of general-use product, the cable is routed or "railed" to preclude occurrence of bad influence in a support system of soft fixation of the HDA. Further, the HDA is soft-secured to the fixed frame, which in turn is mounted into a drive bay of the electronic equipment. This results in achievement of an advantage that the magnetic head settling characteristics are no longer degraded. Additionally a magnetic disk device of the narrow sense as mounted in the electronic equipment is improved in anti-vibration characteristics.

It is permissible that the cable's curved portion is spaced apart from the H/DA's gravity center as long as degradation of settling characteristics is within an allowable range; alternatively, the cable may be modified to be variable in shape. It will also be permissible that when soft-securing the HDA to the fixed frame, a magnetic disk device less in size than those magnetic disk devices (narrow sense) with specification standards adaptable for the drive bay of interest is used to reserve an extra space for use in providing a soft securing mechanism. The cable may include a bundle of multiple signal transmission wires such as flexible printed circuit (FPC) cable or flat cables or else.

More specifically, at least two pairs of link mechanisms or plate members are provided for support between the HDA (including an electronic control circuit board and H/DA) and a fixed frame while causing hinges of them to be laid out along a line segment passing through the center of gravity of such HDA. A relation of this gravity center and the line segment may be determined with accuracies slightly deviated from the exact accuracy of assembling the HDA into the fixed frame. Where the mass of a holder supporting the HDA is not negligible relative to the mass of HDA, the position of the gravity center of certain part including the holder should be taken into consideration. And, let a cable as extended from the HDA be disposed so that its curved portion is identical to the HDA's gravity center. An extra space is defined between the cable extended from the HDA and its associative fixed frame to thereby preclude unwanted inhibition of movement due to soft fixation of the HDA. Additionally the cable extended from the HDA is formed into a crank-like shape with two bent portions at right angles, rather than a straight parallel line. Alternatively, a structure is employable which forms the cable extended from the HDA into a straight parallel line which is bent at more than two portions for wiring.

In case the drive bay of the electronic equipment of interest is inherently designed for installation of a 3.5-inch magnetic disk drive unit, a 2.5-inch magnetic disk drive of commercially available general purpose product is soft-secured to a 3.5-inch type fixed frame; then, the above-stated or later-discussed cable wiring is to be done while retaining a spatial margin for provision of a soft fixation mechanism therein.

Preferably the cable as used herein may be a FPC cable with good temperature characteristics and durability against repeated physical deformation. It is also permissible that electrical signals from the HDA are sent forth to a supervisory or "upper level" apparatus via a drive interface conversion substrate or board.

It should be noted that the drive interface conversion board is an electronic circuit board that is required for conversion of a "native" type of interface into a desired interface in view of the fact that in those magnetic disk devices of narrow sense which are commercially available as general-use products or "after-market" items, the kind of interface is automatically determined depending on the type of connectors and/or commercially available general-use products (magnetic disk devices of narrow sense) per se. Even where such interface conversion is unnecessary, it is inevitable that the cable is extended outwardly from the HDA, which would result in the cable being secured to a specified portion of the fixed frame or other similar housing parts—in view of this, it is important to dispose while taking account of specific viewpoints which follow: The cable is disposed while causing its curved portion to be identical to the center of gravity of the HDA (rotation center); and the cable is hardly brought into contact with the fixed frame to thereby ensure that the counterforce of such cable does not badly affect the support system of soft fixation.

As a result, it becomes possible to suppress decrease in magnetic head positioning accuracy otherwise occurring due to unwanted vibrations of the support system of the cable. The vibrations discussed herein include vibration occurred when an actuator within the H/DA undergoes seeking and also vibration as externally applied thereto—in either case, the present invention offers the intended effects and advantages. Applying this invention makes it possible to install or constitute magnetic disk apparatus of the broad sense capable of exhibiting increased resistivities against vibrations and shocks, which in turn enables improvement in anti-vibration characteristics of electronic equipment concerned.

DETAILED DESCRIPTION OF THE EMBODIMENTS

An explanation will now be given of a magnetic disk device of the broad sense in accordance with one embodiment of the present invention with reference to the accompanying drawings, which is a 3.5-inch magnetic disk drive unit of the so-called form factor type (referred to simply as 3.5-inch type hereinafter while including therein an H/DA and its associative electronic control circuit board). Note here that other magnetic disk drive units including, but not limited to, 2.5-inch type or 1.8-inch type one may also be used. Also note that similar results are obtainable in cases where a 2.5-inch magnetic disk drive is elastically secured or "soft" fixed to a fixed frame having its outer shape adaptable for use with 3.5-inch magnetic disk drives.

Figure 10:
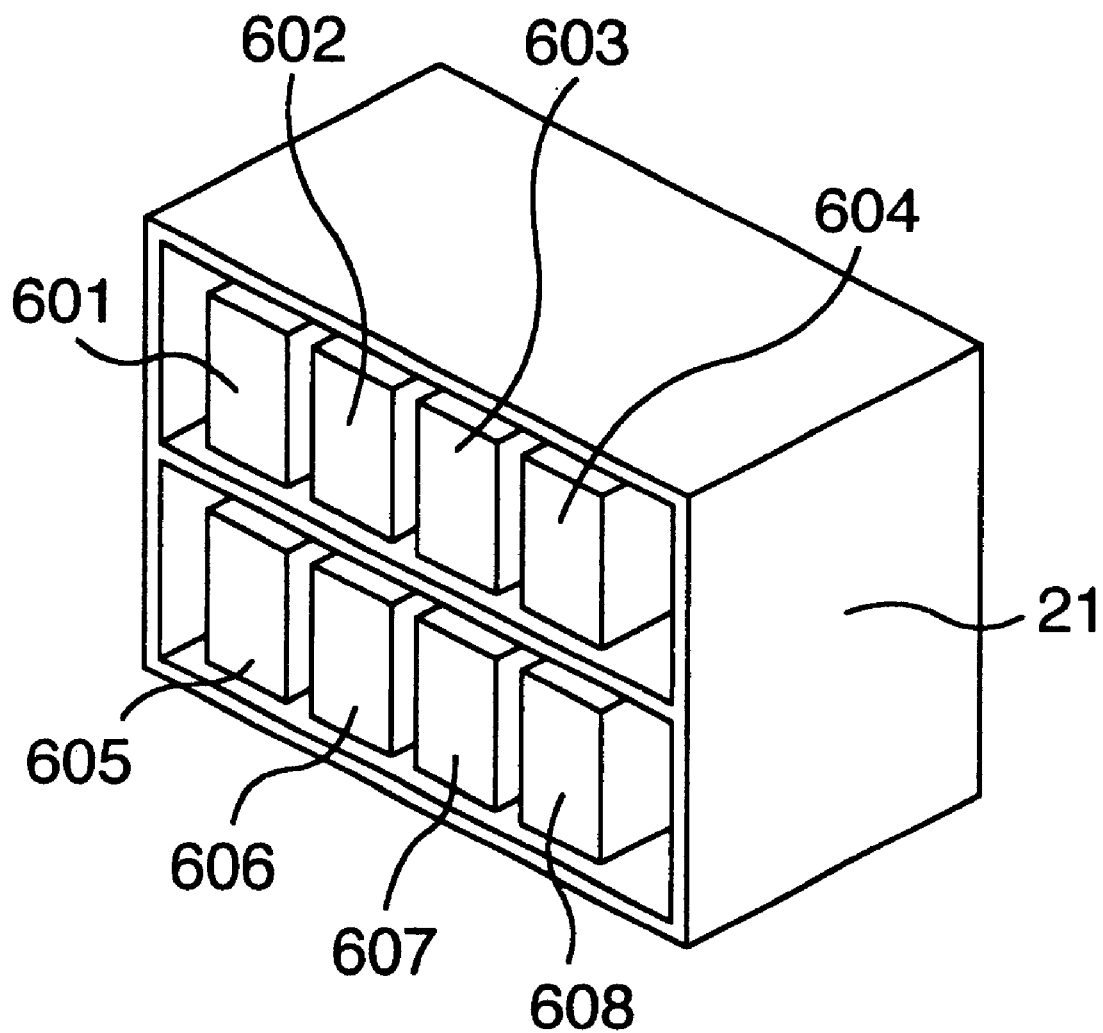
FIG. 10 is a diagram showing an example of large size magnetic disk apparatus or RAID equipment as constituted from a plurality of magnetic disk devices of the narrow sense being enclosed in the same housing 21 through fixed frames 601 to 608.

See FIG. 10, which shows an overall structure of magnetic disk apparatus of the broad sense. An enclosure housing 21 has its interior space in which eight separate magnetic disk drives of the narrow sense are installed via fixation sections or fixed frames 601–608. More specifically, within a fixation section 6 of FIG. 15, an HDA is supported by hinges 701–704 and links 801, 802 so that it is rotatable about a specified axis and is also supported by self weight compensating members 901, 902. The hinges 701, 703 are laid out overlying a line segment that passes through the center of gravity of the HDA. The same goes with the hinges 702, 704. In other words, the HDA as supported by either a link mechanism or plate member is designed so that those hinges being provided at the both ends of such link are disposed on a line segment passing through the center of gravity of the HDA or alternatively disposed within a plane passing through the HDA's gravity center, which makes it possible to lower the support frequency in a direction of spin rotation of the HDA while increasing the efficiency of "soft" fixation. Except for the rotation direction about the such center of gravity, the remaining fixation relative to translational movement is of rigid fixation. In short, this is due to the fact that the link members are designed to support the HDA in its specified direction with increased stiffness. This securing method is discussed in detail in Published Japanese Patent Application No. 8-161880 under the name of the same applicant. This Japanese document discloses therein that in a magnetic disk drive unit with an HDA being supported at a fixation section, said HDA is supported by either a link mechanism or plate member as provided between it and the fixation section while causing those hinges being provided at the both ends of said link mechanism to be disposed within a plane passing through the center of gravity of the HDA. With such an arrangement, it is possible to achieve the intended magnetic disk drive which is capable of supporting the HDA at the fixation section to ensure that the support frequency in the rotation direction is reduced without having to lower the support stiffness or robustness in the linear direction of HDA while at the same time preventing reduction of the head positioning accuracy even upon application of external vibration thereto.

Figure 1:
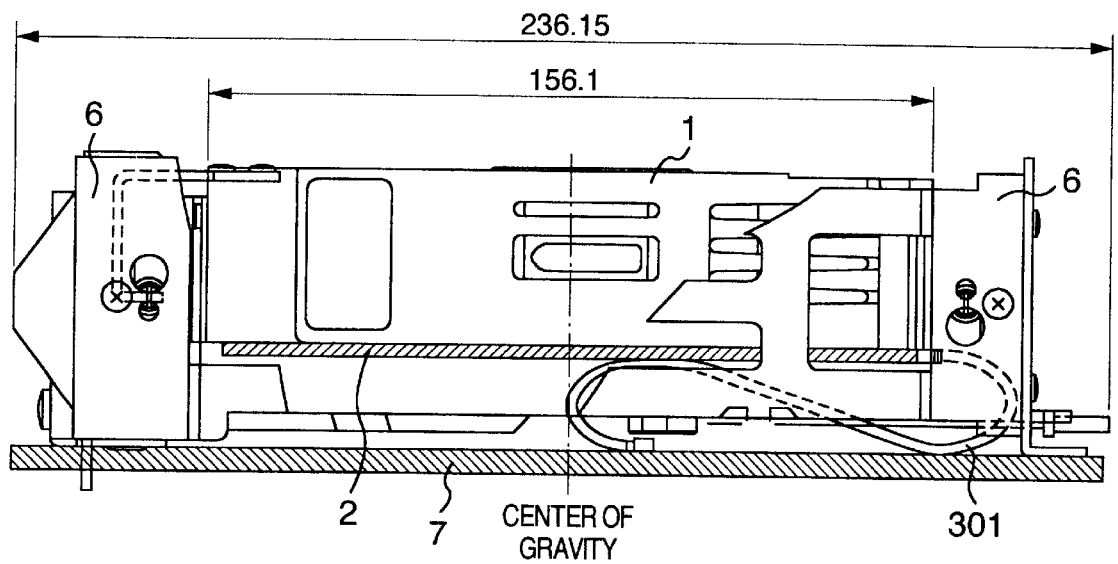
FIG. 1 is a diagram showing a plan view of a support structure of a magnetic disk drive in accordance with a first embodiment of the present invention.
Figure 2:
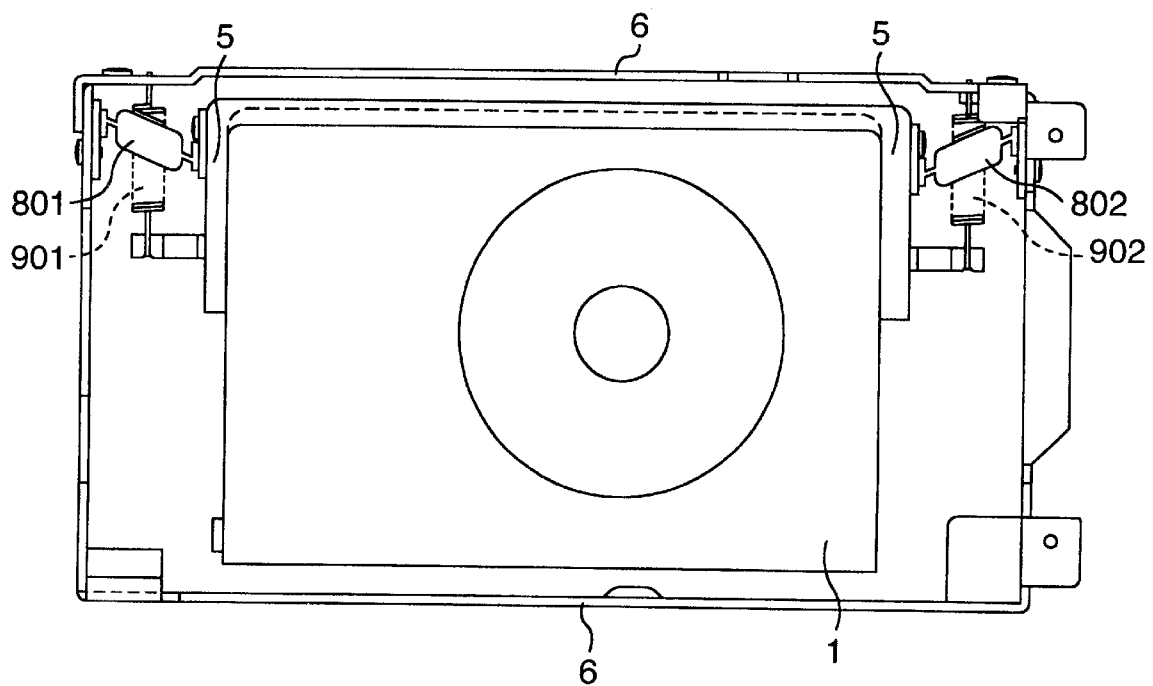
FIG. 2 is a diagram showing a front view of the support structure of the magnetic disk drive of FIG. 1.
Figure 11:
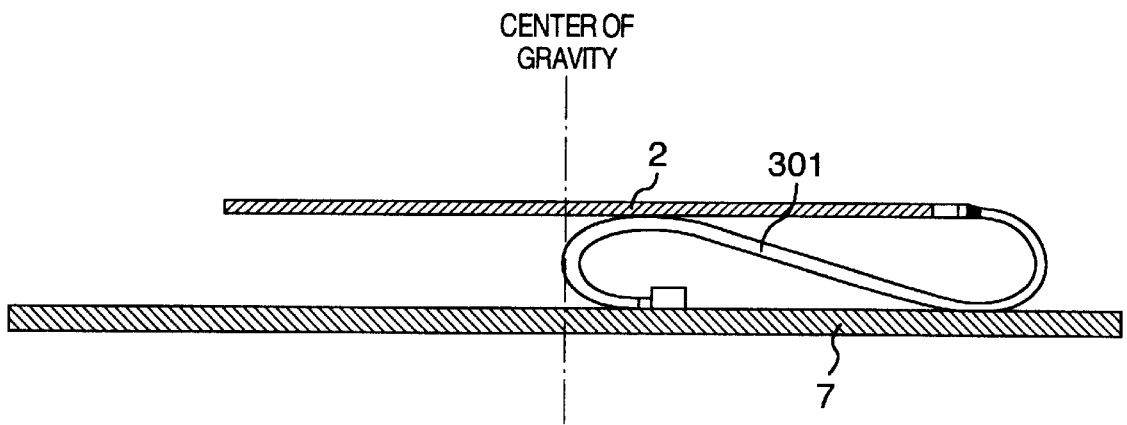
FIG. 11 is a diagram showing a skeleton structure with an electronic control circuit board 2 and FPC 301 plus drive interface conversion board 7 being taken away from the structure of FIG. 1.

FIG. 1 is a diagram showing a plan view of a support structure of a magnetic disk drive unit in accordance with a first embodiment of the present invention; and, FIG. 2 depicts a front view thereof. Reference numeral "1" designates an H/DA; numeral 2 denotes an electronic control circuit board; 5 indicates a holder that supports the H/DA; 6 is a fixation section or fixed frame; 7, a drive interface converting substrate; 301, an FPC cable; 901 and 902, self weight compensation members; 801–802, link mechanisms. Note that the holder 5 may be designed to support the HDA while the component 7 is replaceable with a frame member for use in securing the HDA when the need arises. In addition, FIG. 11 is a diagram showing the electronic control circuit board 2 and drive interface conversion substrate 7 plus FPC cable 301 as taken out of the structure of FIG. 1 for indication of an FPC curved portion in a visually understandable fashion. Any one of those members shown in FIG. 11 is illustrated in side view under the situation that a principal plane of the magnetic disk device of the narrow sense is put in parallel to a horizontal plane. The FPC 301 is the cable with a width which consists essentially of a bundle of a plurality of parallel electrical wires extending in a direction at right angles to the drawing sheet of FIG. 11. This cable is designed to have branch sections at an edge of the substrate 7 to thereby function as a power supply cable and also as a signal transmission cable.

As shown in FIGS. 1–2, the H/DA 1 and the electronic control circuit board 2 for controlling the same are attached by the two pairs of link mechanisms within the fixation section 6 of substantially rectangular shape with the holder 5 disposed therebetween. The FPC 301 as attached to the electronic control circuit board 2 is bent at its two separate positions and is electrically connected at a selected location corresponding to the position of the center of gravity of the H/DA 1 overlying the drive interface conversion substrate 7. Although the FPC 301 is in contact with a respective one of the board 2 and substrate 7, this embodiment is free from any inconvenience otherwise occurring due to contact. This can be said because the cable 301 is secured to the board 2 at the contact portions. In short, let a selected curved portion of the cable 301 in close proximity to the board 2 be identical in position to the HDA's rotation axis to make sure that counterforce of this cable no longer affects rotation of the HDA. Preferably the remaining curved portion of the cable 301 adjacent to the substrate 7 is not contacted with the substrate 7. Optionally a dielectric film or a film of less friction may be provided between the cable 301 and substrate 7.

Since in FIG. 1 the HDA is supported in such a manner as to be rotatable about an axis shown by dash-dot line to indicate the position of the center of gravity, it is required that the FPC 301 be routed or "railed" not to disturb this rotational motion. The drive interface conversion substrate 7 is the substrate that selects an appropriate interface for connection between the magnetic disk device of narrow sense and a controller unit of disk array apparatus, wherein a fiber channel or SCSI or the like is mainly employed as the interface for connection with the controller unit of disk array apparatus. Note here that when a single magnetic disk drive is installed into the drive bay of electronic equipment, such drive interface conversion substrate 7 is no longer required-although the substrate 7 becomes part of such electronic equipment's housing, the FPC 301 is fastened at the HDA's gravity center position as shown in FIG. 1 or FIG. 11.

The H/DA 1 and the electronic control circuit board 2 attached thereto are typically secured to the holder 5 by screwing techniques using more than one screw hole being defined in the magnetic disk device of narrow sense for installation into a personal computer or else. In addition the two pairs of link mechanisms 801, 802 and two pairs of self weight compensation members 901, 902 are attached to the holder 5 for support to the fixation section 6. Letting this structure be a structure with the fixed frame 6 being as an outer shape of 3.5-inch magnetic disk drive while at the same time designing either the H/DA or HDA using that of 2.5-inch magnetic disk drive, it is possible to apply the present invention to any electronic equipment with the magnetic disk device of narrow sense being mounted therein. Furthermore, it is also possible to apply the present invention while employing a structure with the fixed frame 6 being as an outer shape of 2.5-inch magnetic disk drive and also designing the H/DA or HDA using that of 1.8-inch magnetic disk drive. In this way the present invention may be applied with use of a magnetic disk drive less than a predetermined type one.

The H/DA 1 and electronic control circuit board 2 in this state are electrically connected via FPC from a connector of the board 2 to the drive interface conversion substrate 7. This FPC is designed to have a bent/folded structure with more than one bent portion or curved portion added thereto.

In case the above-noted FPC 301 is used, as far as a 3.5 inch form factor type H/DA is concerned, the resulting connector position is always at a distal end portion of the electronic control circuit board 2 as shown in FIG. 1. In the event that the FPC 301 is connected at such position for connection to its neighboring drive interface conversion substrate 7, it is required that its cable length be 70 mm or greater, which value is half of the entire length of the 3.5 inch form factor type H/DA. And, the inventors as named herein have found that unless such FPC 301's curved portion is aligned with the gravity center position of the HDA, the resultant magnetic disk device of narrow sense decreases in vibration characteristics of the support system thereof. Further, FPC's friction torque can take place due to the fact that the FPC is railed while its curved portion is twisted, resulting in a decrease in reliability (lifetime): To avoid this problem, it is required that the FPC be secured to either the HD/A 1 or substrate 7. Adversely, if the FPC 301's curved portion is disposed exactly at the HDA's gravity center position then the resulting settling characteristics become more advantageous during positioning of an actuator(s).

Possible vibrations occurring at the support system in the case of the FPC's curved portion lying at the position of the HDA gravity center and also in the case where the former is deviated from the latter are shown in FIGS. 3 through 9 by use of actual measurement values of the housing acceleration and servo status plus position error signal (PES). What can be said in common to these diagrammatic representations is as follows. Note here that in FIGS. 7 to 9, several legends including a longitudinal axis and lateral axis and others are omitted therein because these are the same as those used in FIG. 5.

Figure 15:
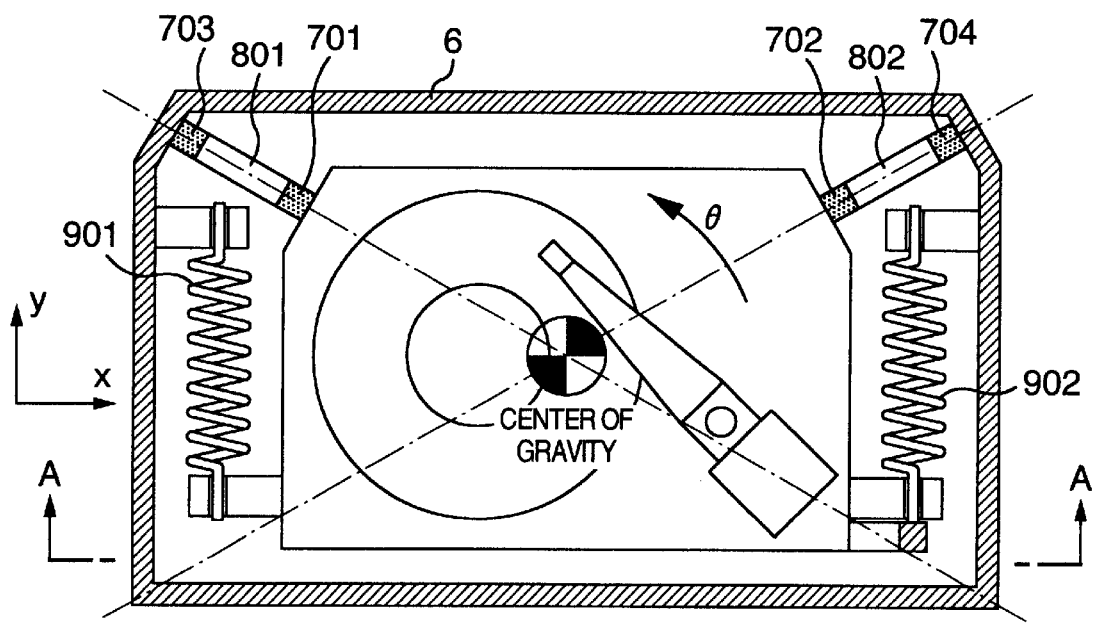
FIG. 15 is a diagram for explanation of a link mechanism for use in soft-securing either an HDA or H/DA along with a self weight compensating member used.

1) The H/DA is a 3.5-inch form factor type H/DA of commercially available general purpose product, also known as after-market item in the art, which is supported at a holder as fabricated through machining of an aluminum plate while being secured (elastically or "softly" fastened) to either a drive bay or the housing of magnetic disk apparatus of the broad sense with use of the link mechanisms and self weight compensation members as shown in FIG. 15. Additionally the material of such holder should not be limited only to aluminum and may alternatively be made of any one of other metals including but not limited to stainless steel, iron, duralumin, and magnesium, with adjustability by the spring modulus of the self weight compensator members.

2) An accelerometer used is attached on the H/DA's I/F connector side (a side surface from which electrical lead wires are taken out for externally deriving signals concerned) which is the second greatest side surface of the H/DA at a selected position spaced apart by 15 mm from the connector side to ensure that the sensitivity becomes sensitive to the acceleration in vertical direction. The environment surrounding the H/DA is set at a temperature of 10° C.

3) The position of the center of gravity of the HDA is at the center on a principal surface of the H/DA, which is spaced apart by 68 mm from the connector side thereof. During measurement, electrical lead wires (cable or FPC wires) as taken out of the H/DA are bundled and fixed together by an adhesive tape to the holder placed at a specified location spaced by 10 to 20 mm from a corner edge of the H/DA in a manner such that the wire bundle is folded at a portion adjacent to the HDA gravity center and is then connected to a connector that is provided overlying a substrate, fixed frame or frame member (referred to simply as a "substrate" hereinafter) which is spaced at a distance of 5.5 mm from the principal surface of the H/DA.

It is to be noted that in case the substrate is the fixed frame or else, the wire bundle is fastened at its end to a certain member for use in securing the cable in place of the connector. In the case of FPC wiring, a cable is used which has its width in the vertical direction to the drawing sheet in a respective one of FIGS. 3, 6 and 8.

4) The moment of inertia (kg·m·m) of the HDA as measured about either the rotation shaft of a spindle motor or the rotation axis of an actuator is such that a moment component due to the HDA measures 0.0025 (kg·m·m) and that due to an aluminum plate with a thickness of 2 mm is 0.00033 (kg·m·m), resulting in measurement of 0.0283 (kg·m·m) in total since in these drawings the H/DA has no dead weight.

Figure 3:
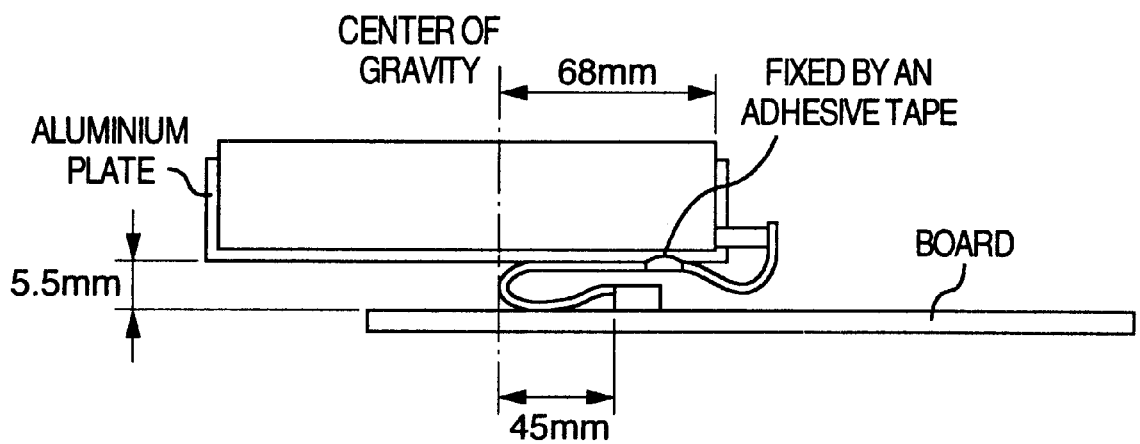
FIG. 3 is a diagram showing a layout of an HDA and holder along with a cable and electronic control circuit board during measurement of vibration characteristics and also showing the case of causing the cable's curved portion to be aligned with the HDA's gravity center position.
Figure 4:
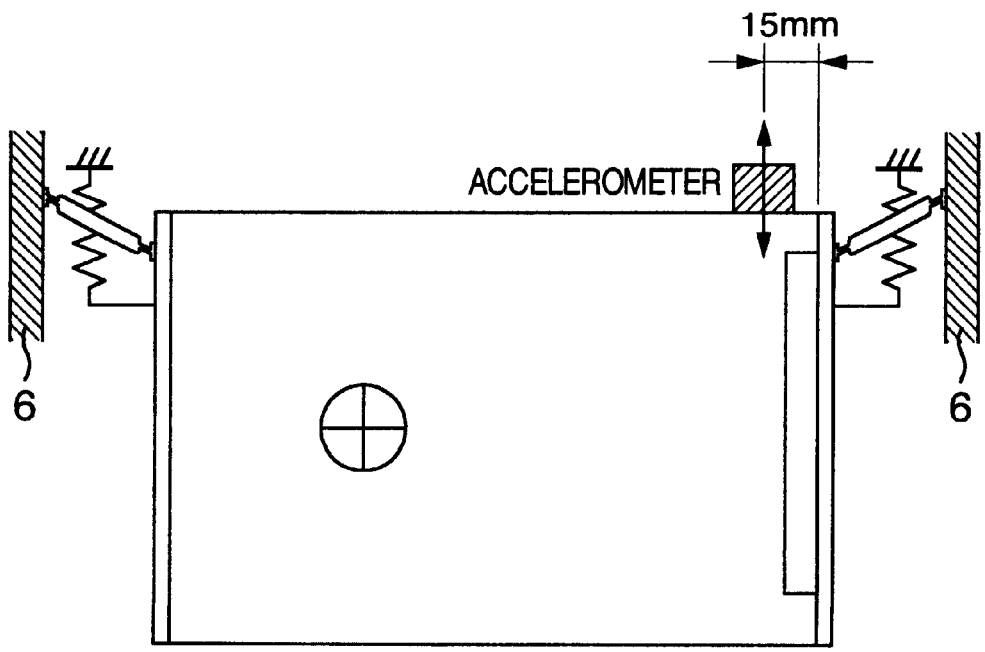
FIG. 4 is a diagram for explanation of those positions of an H/DA support mechanism and accelerometer used for measurement of the vibration characteristics.

FIG. 3 shows a case where the FPC's curved portion and HDA gravity center position (center of rotation) are combined together. A distance between the curved portion and a connector overlying the substrate is 45 mm.

Figure 6:
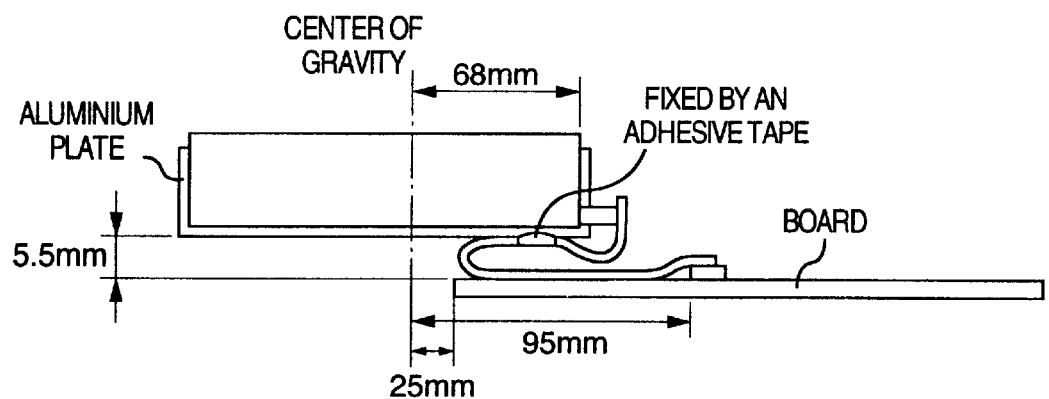
FIG. 6 is a diagram showing a layout of an HDA and holder along with a cable and electronic control circuit board during measurement of vibration characteristics and also showing the case of preventing the cable's curved portion from being aligned with the HDA's gravity center position.

FIG. 6 shows a case in which the FPC's curved portion is offset in position relative to the HDA gravity center position toward the H/DA connector side by 25 mm. A distance between the curved portion and the connector overlying the substrate is 95−25=70 mm.

Figure 8:
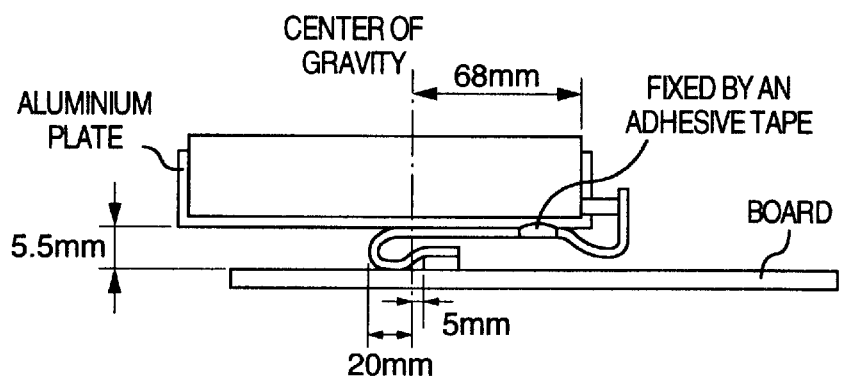
FIG. 8 is a diagram showing a layout of an HDA and holder along with a cable and electronic control circuit board during measurement of vibration characteristics and also showing another case of preventing the cable's curved portion from being aligned with the HDA's gravity center position.

FIG. 8 shows a case where the FPC's curved portion is offset in position relative to the HDA gravity center position toward the H/DA connector side by 20 mm in the reverse direction to the above case. A distance between the curved portion and the connector overlying the substrate is 20+5=25 mm.

Figure 5:
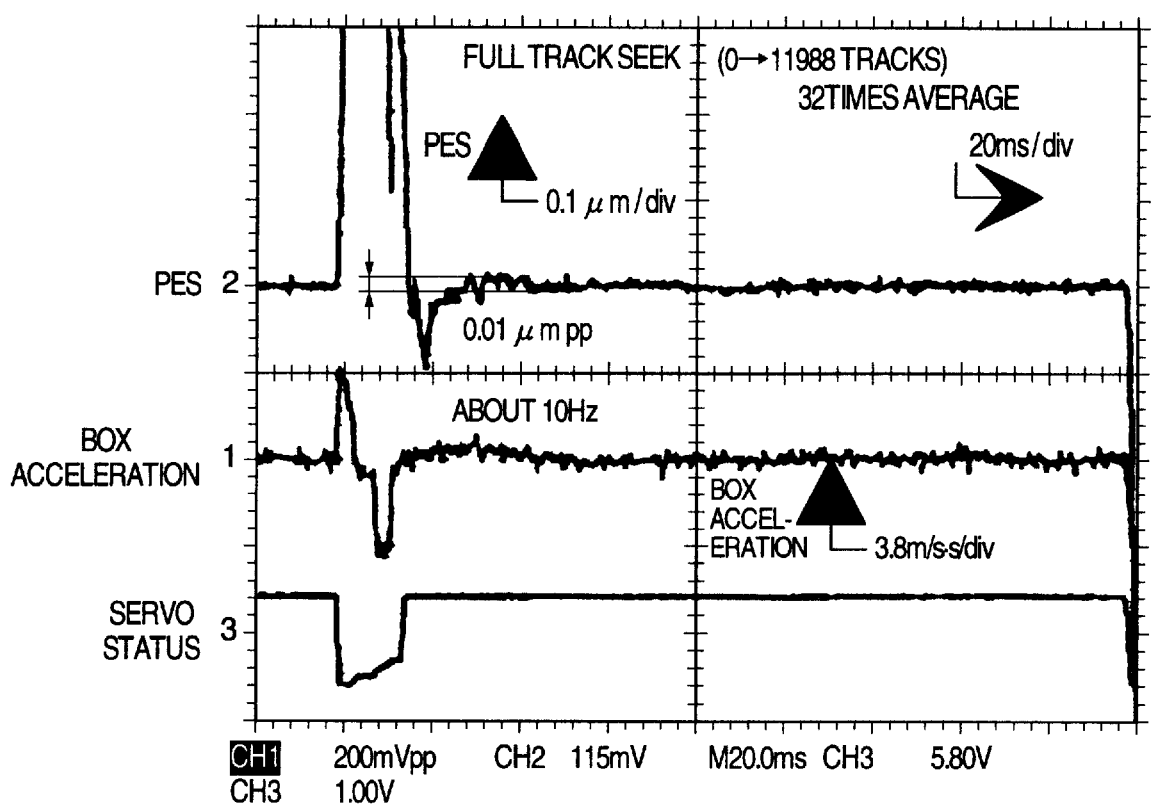
FIG. 5 is a graph showing measurement results of the magnetic disk drive's PES and housing acceleration plus servo status in the support structure of FIG. 1 or 3.
Figure 7:
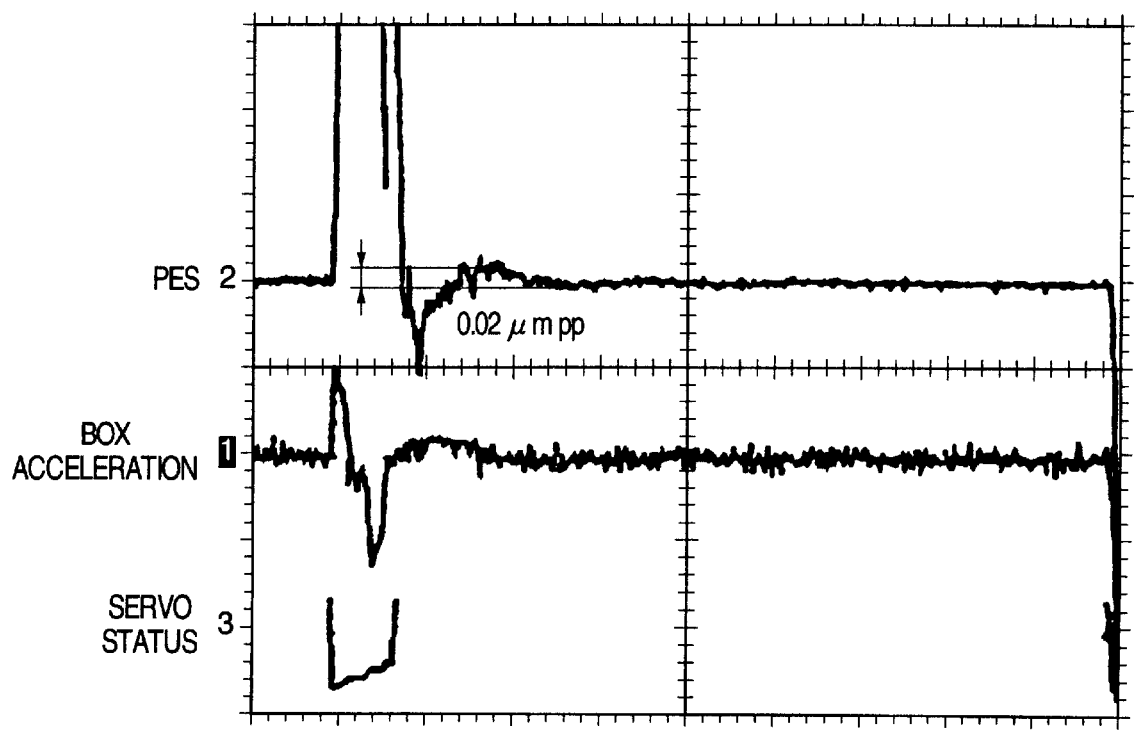
FIG. 7 is a graph showing measurement results of the magnetic disk drive's PES and housing acceleration plus servo status in the support structure of FIG. 6.
Figure 9:
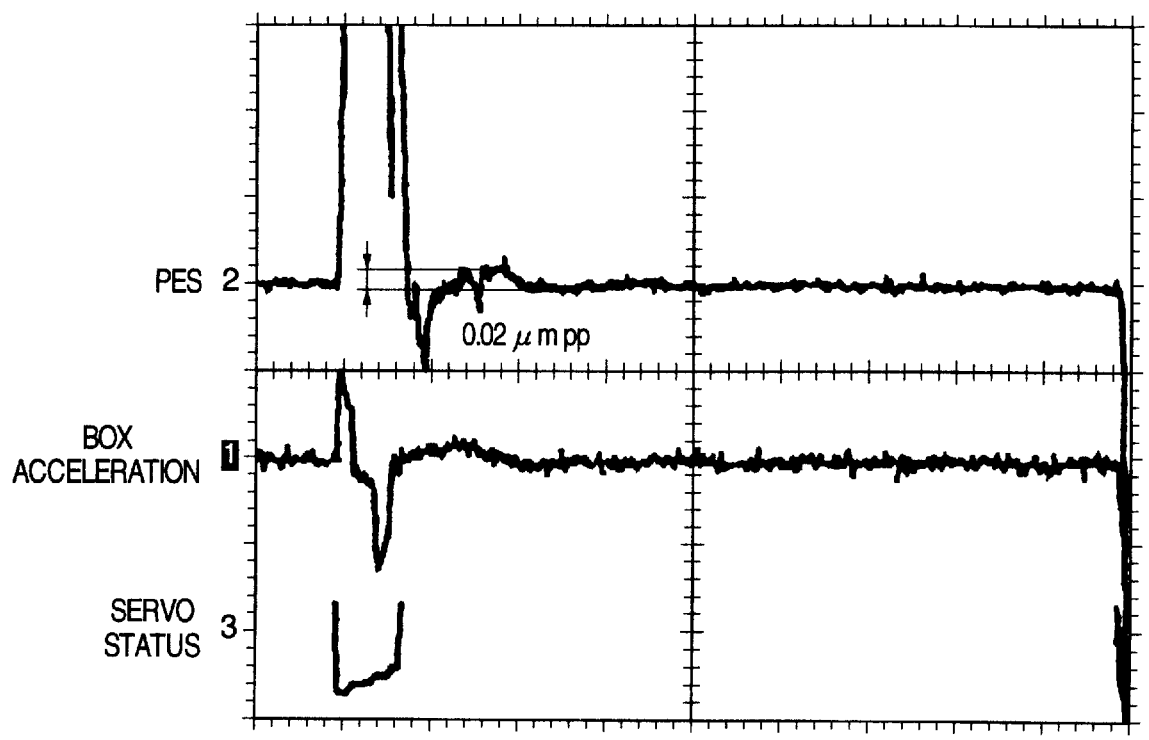
FIG. 9 is a graph showing measurement results of the magnetic disk drive's PES and housing acceleration plus servo status in the support structure of FIG. 8.

In a way corresponding to respective diagrams, some measurement values are shown in FIGS. 5, 7 and 9, which values are indicative of a position error signal (PES, referred to as "POS_E" signal hereafter) of the H/DA in these states and also the acceleration applied to the H/DA.

In each of FIGS. 3, 6 and 8, seeking is made between specific identical cylinders of the H/DA. In other words, full track seek (seeking from an outermost 0-th track up to innermost track with the number "11,988" added thereto) is performed. Due to this, substantially the same signal is observed in the servo status, which signal corresponds to movement or motion of the actuator. In comparison with the manner of the POS_E signal immediately after this seeking has reached its stable equilibrium state, the POS_E signal in the case of the FPC's curved portion combined with the gravity center portion (FIG. 3) is such that 1div is at 0.1 μm as shown in FIG. 5, resulting in a peak-to-peak value of 0.01 μm (0.01 μmpp). In contrast, the POS_E signal obtained in the case of the FPC's curved portion offset by 25 mm toward the H/DA connector side with respect to the gravity center position (FIG. 6) measures 0.02 μmpp as shown in FIG. 7; the POS_E signal in the case of the FPC's curved portion offset by 20 mm toward the opposite side of the H/DA connector with respect to the gravity center position (FIG. 8) is 0.02 μmpp as shown in FIG. 9.

In this way, it has been affirmed that in case the FPC's curved portion is not combined with the HDA gravity center portion, support-system vibration takes place in PES which is two times greater than that obtained when the both are combined together, which in turn results in a likewise decrease in magnetic head positioning accuracy.

An explanation will next be given of the risk of bad influence upon the PES signal due to railing of the FPC with reference to FIGS. 16 to 22. Those legends other than the PES signal's amplitude value—namely acceleration waveform, degree of seeking, longitudinal axis, lateral axis and the like—will be eliminated as these are the same as the ones used in FIGS. 5, 7 and 9.

Figure 16:
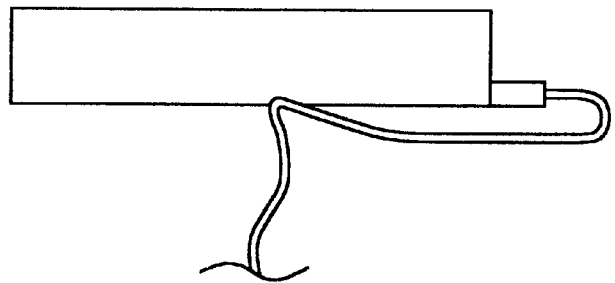
FIG. 16 is a diagram schematically showing an HDA support structure in case one end of a cable is made free for preclusion of influence of a counterforce of the cable.

FIG. 16 is a depiction with the aluminum plate of FIG. 3 omitted, wherein a cable (power supply cable alone) is straightly extended outwardly from the HDA and then once folded at a portion near the connector to be fixed at the gravity center position of the HDA, which becomes a free end without being secured to the substrate and other fixed frames. This layout is aimed at reduction of influence of the cable. An accelerometer's position is the same as that in FIG. 4. The POS_E signal's swing deviation amplitude at this time was 0.01 μmpp. This may be considered to be a minimal value.

Figure 17:
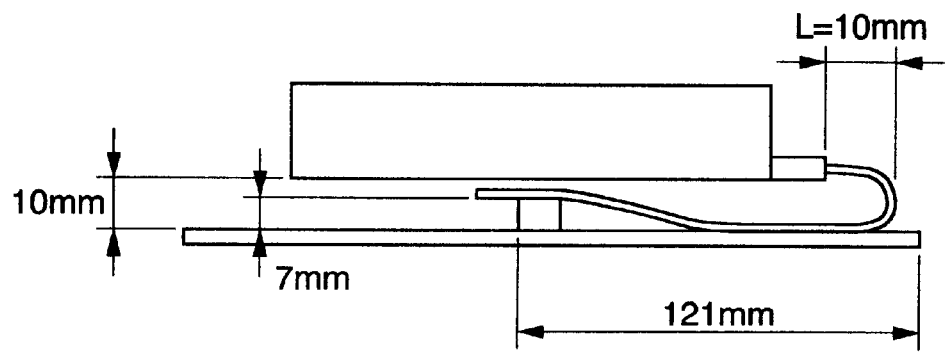
FIG. 17 is a schematical diagram for explanation of an HDA support structure in case only a power supply cable is provided.

Referring next to FIG. 17, the cable as extended from the connector is a power supply cable alone, which is disposed to come into contact with the substrate; in this case, the resultant POS_E signal measures 0.015 μmpp in deviation amplitude, which is worse by little.

Figure 18:
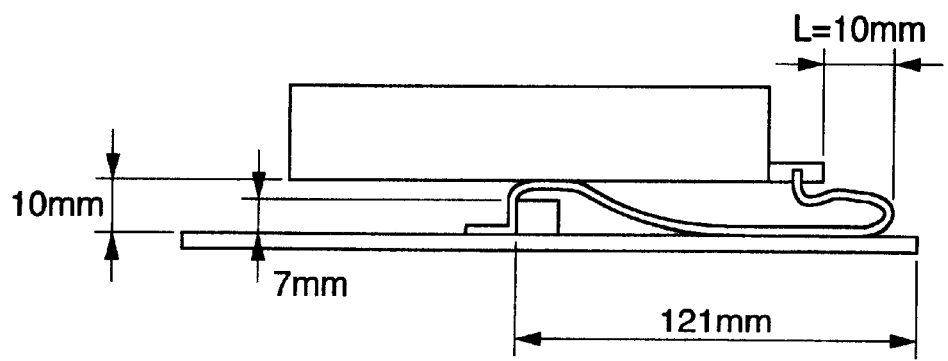
FIG. 18 is a schematic diagram for explanation of an HDA support structure in case an LW cable is used in addition to the power supply cable.

See next to FIG. 18, wherein a pull-out port of the cable from the H/DA is replaced with a connector that is extended outwardly at right angles toward the substrate side (referred to as "LW cable" hereinafter) while letting the other end of a bundle of cables including more than one data transfer cable in addition to the power supply cable be connected in such a way as to wrap an on-board connector unlike the structure of FIG. 17—in this case, the resulting POS_E signal measures 0.03 μm in deviation amplitude, which is much worse. It is considered that this is due to the fact that part of the cable is brought into contact with the H/DA when connecting to the on-board connector.

Figure 19:
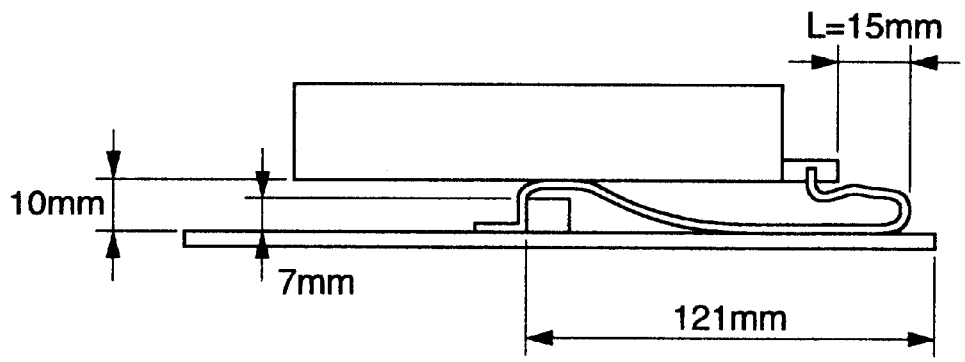
FIG. 19 is a schematic diagram for explanation of an HDA support structure in case the LW cable is extended at its folded or turn-around portion in the support structure of FIG. 18.

See FIG. 19, which shows a positional relationship in case the folded portion of the LW cable is lengthened (L=15 mm). In this case the POS_E signal's deviation amplitude is 0.04 μmpp, which is the worst value. It will be understood that even in this case, when adding a fold-guide shape to a portion as shown by arrow in FIG. 20 to thereby preclude the cable from coming into contact with the substrate, the POS_E signal's deviation amplitude becomes 0.02 μm, leading to improvement.

Figure 20:
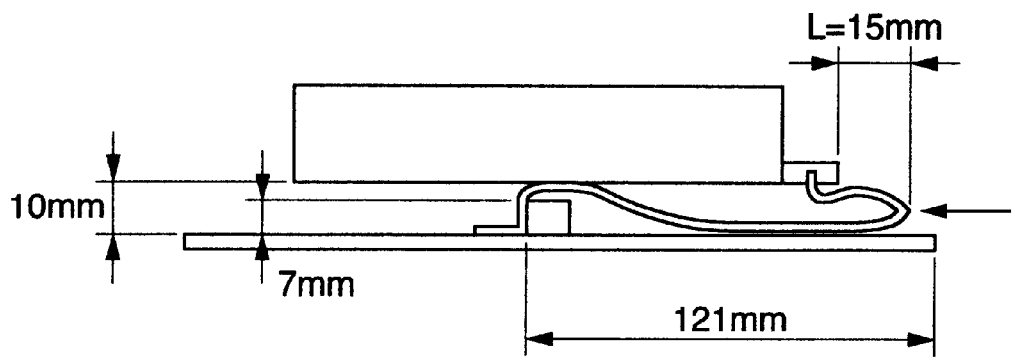
FIG. 20 is a schematic diagram for explanation of a support structure in case the cable is added with a fold guide shape in the support structure of FIG. 19.
Figure 21:
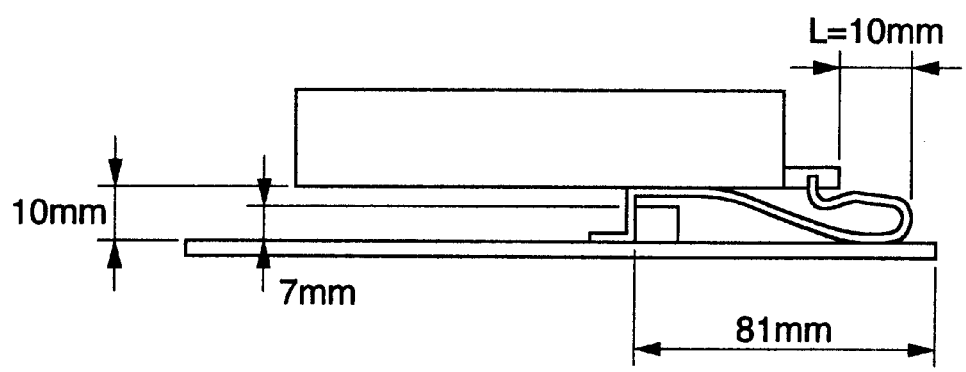
FIG. 21 is a schematic diagram for explanation of a support structure in case the cable is shortened in the support structure of FIG. 20.
Figure 22:
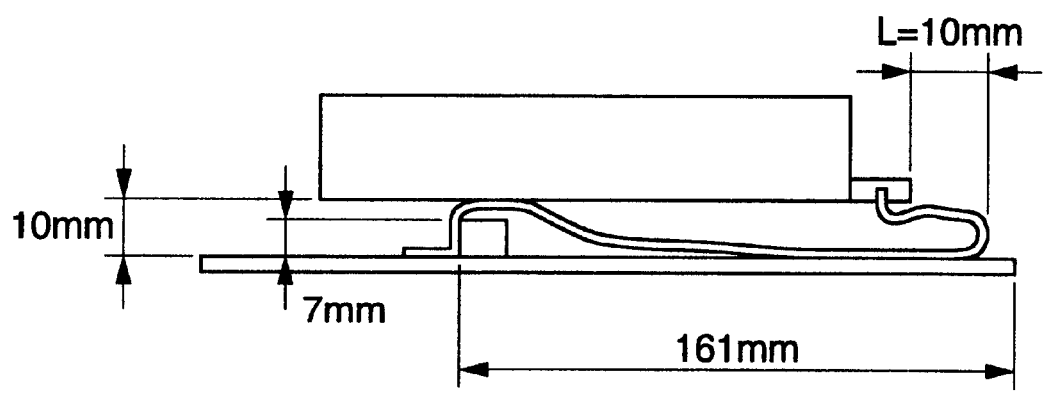
FIG. 22 is a schematic diagram for explanation of a support structure in case the cable is lengthened in the support structure of FIG. 20.
Figure 23:
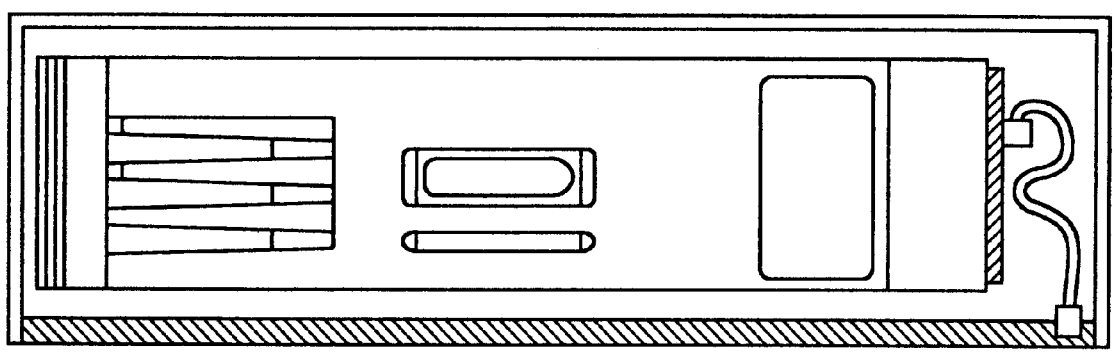
FIG. 23 is a diagram for explanation of a cable wiring/routing pattern in the case of using a prior known dedicated HDA.

In the event that the cable is shortened as shown in FIG. 21, the POS_E signal's deviation amplitude is 0.03 μmpp, which is worse than that in the case of FIG. 20. It is considered that this is because the cable's counterforce increases with a decrease in cable length. On the other hand, it will be understood that when the cables is long, special care should be taken to contact with the substrate or the H/DA. In FIG. 22 the cable is lengthened resulting in its contact portion increasing in length accordingly, causing the POS_E signal's deviation amplitude to stay at 0.03 μmpp without association of any appreciable improvement.

Figure 12:
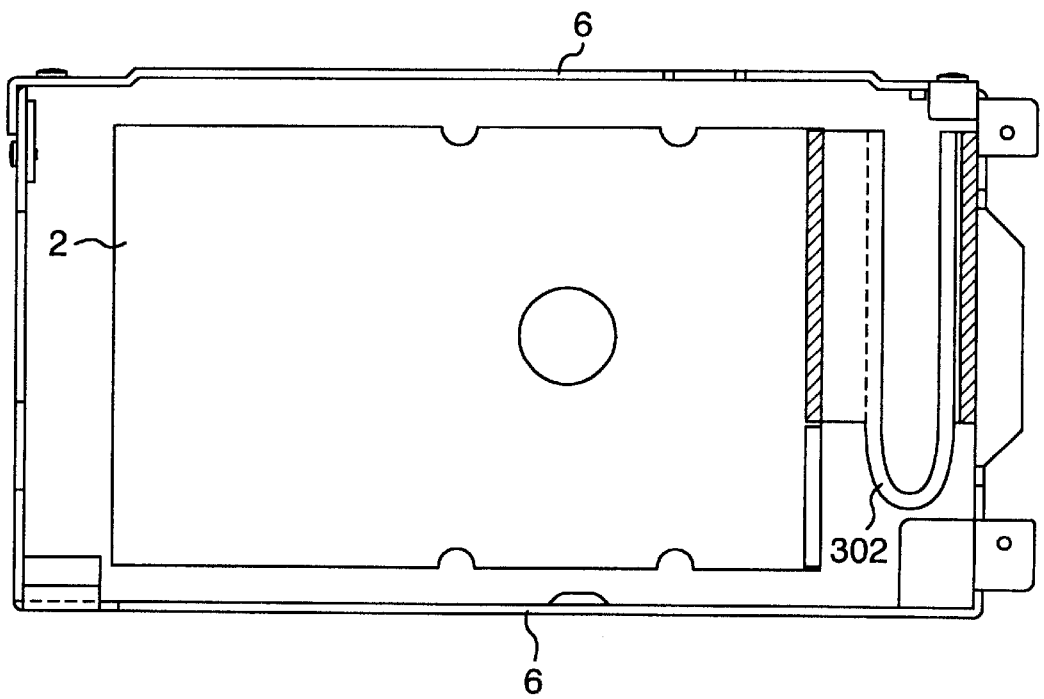
FIG. 12 is a diagram for explanation of a structure for connection with an electronic control circuit board 2 and FPC 302 along with a fixation section or fixed frame 6 in accordance with a second embodiment of the invention.
Figure 13:
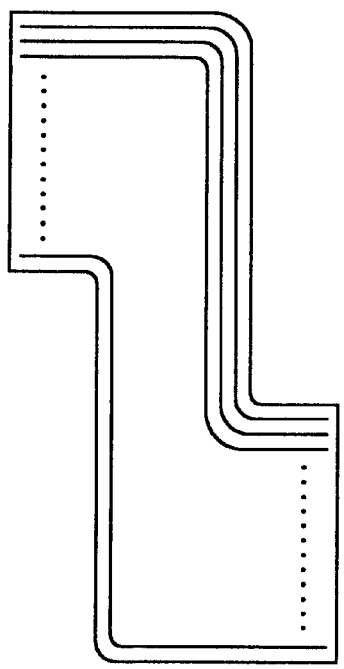
FIG. 13 is a diagram showing a crank shape of the FPC 302 of FIG. 8.

FIG. 12 is a diagram showing a front view of a magnetic disk device in accordance with a second embodiment of the invention. In this drawing, numeral 2 designates an electronic control circuit board 2; 302 denotes an FPC cable; 6 is a fixation section. This embodiment is structurally arranged so that an H/DA and the electronic control circuit board 2 for control of the H/DA are received within the fixation section of almost rectangular shape and supported therein via a holder by use of two pairs of link mechanisms (not shown) each acting as a support device. The electronic control circuit board 2 and a drive interface converter substrate 7 are connected together by the FPC 302. And, the FPC 302 is folded into a "U"-like curved shape at a portion along a side of the H/DA from the electronic control circuit board 2 for connection to the drive interface converter substrate as shown in FIG. 12. In this case the FPC 302 is designed so that as shown in FIG. 13, a bundle of parallel electrical wires as taken out of the electronic control circuit board 2 is once curved at right angles and then folded at the U-like portion of FPC 302; thereafter, it is again curved at right angles to be connected to a connector on the fixation section 6 side.

While such the lead wiring is preferably achieved by use of FPC in view of the durability and temperature characteristics, similar results are also obtainable using a flat cable. Additionally it should be required that the U-like portion of the cable 302 of FIG. 12 be as long as possible to thereby prevent occurrence of influence on the H/DA's rotatable supporting.

With the cable bend/folding scheme noted above, even upon occurrence of externally applied vibrations and/or shocks along with vibrations occurring due to seeking within the H/DA, it is possible to suppress unwanted vibration in the support system due to such influence while at the same time enabling suppression of reduction in magnetic head positioning accuracy. In addition, as far as the FPC structure of FIG. 12 or 13 is employed, it is possible to avoid creation of a friction torque of the FPC otherwise occurring due to deformation of the FPC's curved portions or due to contact between the FPC and other members operatively associated therewith while preventing deterioration of vibration characteristics and reliability (lifetime). Note here that although the link mechanisms are designed to support the HDA at its two corner edge portions as shown in FIG. 2, these may be modified to support the same at four corner edges thereof.

Figure 14:
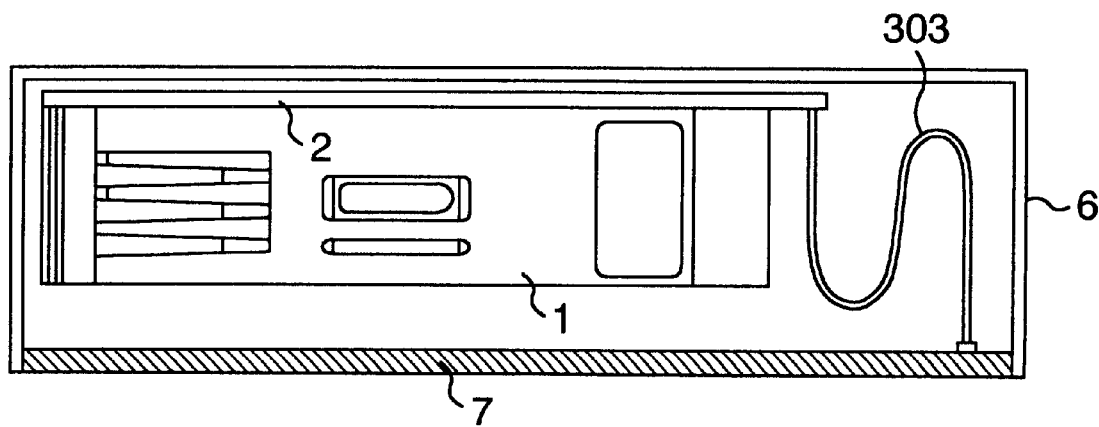
FIG. 14 depicts a plan view of a magnetic disk drive in accordance with a third embodiment of the invention, for explanation of a structure for connection with an electronic control circuit board 2 and FPC 303 along with a fixation section or fixed frame 6.

FIG. 14 is a diagram showing an upper plan view of a magnetic disk drive unit in accordance with a third embodiment of this invention. In FIG. 14, numeral 1 designates an H/DA; 2 denotes an electronic control circuit board; 303 is an FPC; 6, a fixation section; 7, a drive interface converter substrate which also functions as a fixed frame 6 of the HDA. In FIG. 14, when letting the fixation section 6 be a drive bay, a spatial margin is retained for provision of a soft securing mechanism by use of a small size magnetic disk device (narrow sense) less in dimension than those magnetic disk devices (narrow sense) with specifications adapted for such drive bay.

As shown in FIG. 14, this magnetic disk drive is structurally arranged so that the H/DA 1 and the electronic control circuit board 2 for controlling the same are attached by screws while causing the electronic control circuit board 2 and the drive interface converter substrate 7 to be connected together by the FPC 303. The FPC 303 as used herein is the one that has an ensemble of straight parallel lead wires, which is twice folded on the lateral side of the H/DA 1 from the electronic control circuit board 2 for connection to the drive interface converter substrate. It is required that the FPC and the fixation section 6 be laid out so that these are not in contact with each other. Preferably, the FPC 303 is greater in length than the FPC as used in the embodiment of FIG. 1 and is folded twice or more for fixation to the substrate 7 in order to avoid any disturbance against the rotation due to the H/DA's soft fixation. With such multiple folding scheme for providing more than two curved portions, it is possible, upon application of external vibrations and/or shocks and also creation of vibrations due to seeking within the H/DA, to suppress any vibrations in the support system due to such influence while simultaneously enabling suppression of reduction in magnetic head positioning accuracy. In addition, with the FPC structure embodying the invention, the counterforce of the FPC occurring due to deformation of FPC's curved portions may be reduced thus lightening a deleterious change of reliability (lifetime).

Although the embodiment stated supra is illustratively designed to employ the 3.5-inch form factor type H/DA and its associative electronic control circuit board for controlling this H/DA, these may be replaced with a 2.5-inch form factor type H/DA and electronic control circuit board for controlling the same or alternatively with a 1.8-inch form factor type H/DA and electronic control circuit board for controlling same on a case-by-case basis—in any case, the same results are obtainable as far as the magnetic disk device concerned, which is inherently designed to use an FPC for connection from the electronic control circuit board to the drive interface converter substrate.

Turning to FIG. 10, there is shown one exemplary disk array apparatus that is structured from a housing and a plurality of magnetic disk devices of the narrow sense each incorporating the principles of the invention. As readily occur to those skilled in the art, use of such multiple magnetic disk devices packed together at high density within the same housing in the way stated above would result in creation of vibrations when exchanging of a magnetic disk device, which in turn causes bad influence of vibrations upon its neighboring H/DAs in a magnetic disk system that is designed to continue operating without any interruptions for 24 hours per day if the system design fails to take account of vibration problems, leading to occurrence of serious problems such as reduction of magnetic head positioning accuracy and also operation failure of the system. Fortunately, with the support structure embodying the invention, it is possible to suppress such magnetic head positioning accuracy reduction due to external vibration application and/or vibration creation within the H/DA.

Another advantage of applying the invention when one or more magnetic disk devices of narrow sense are mounted in electronic equipment lies in an ability to achieve the intended electronic equipment less in affectabilities due to internal/external vibrations. To this end, a specific support structure is employed which offers rigid or "hard" fixability in a translational movement direction while at the same time exhibiting resilient or "soft" secure supportability in another direction identical in moment to the rotation of a spindle and/or actuator used therein, and which is designed to employ those magnetic disk drive units of commercially available general purpose products or "after-market" items. Remember that the prior art is such that when mounting more than one magnetic disk device of the narrow sense, such mounting was done while causing either the spin rotation shaft of a spindle of such magnetic disk device or the center axis of rotary motion of an actuator to be identical to the vertical direction. Applying the soft fixation architecture of the invention to those general-use magnetic disk devices of narrow sense is to be understood to mean that magnetic disk drive mounting is performed while letting the magnetic disk driver's spindle rotation shaft and/or the center axis of rotary motion of its actuator be placed in parallel to a plane at right angles to the vertical direction. The electronic equipment to which the invention is preferably applied. may include modern computer-assisted instruments as built in land vehicles including automatic travel route guidance apparatus called car navigation systems or else, which often suffer from vibrations as externally applied thereto.

It must be noted that when a shaft bearing structure used could be further increased in stiffness or robustness, it is possible to apply the soft fixation scheme of the invention to cable wiring processing while permitting the spin rotary shaft of the spindle of a magnetic disk device to be identical to the vertical direction.

It is possible to employ for mounting to disk array apparatus those H/DA modules of the commercially available general-use products along with an electronic control circuit board(s) for controlling operations thereof without having to use any special-use H/DA units exclusively dedicated to the disk array apparatus and electronic control circuit board(s) for control thereof.

As the use of general-use magnetic disk devices of the narrow sense makes it possible to attain magnetic disk apparatus of the broad sense comprising in a single housing a plurality of HDAs, it becomes possible to constitute the intended magnetic disk apparatus of broad sense which is capable of offering increased reliability at low production costs.

Applying the invention to a structure for use in supporting more than one magnetic disk device of narrow sense in a drive bay of electronic equipment advantageously makes it possible to improve the anti-vibration characteristics of such electronic equipment.

While the invention has been described with reference to specific embodiments, the description is illustrative of the invention and is not to be construed as limiting the invention. Various modifications and alterations may occur to those skilled in the art without departing from the true spirit and scope of the invention as defined by the appended claims.

What is claimed is:

1. A magnetic disk drive comprising:
   a fixed frame or fixation section;
   a hard disk assembly supported in said fixed frame or fixation section;
   a link mechanism or link member between said hard disk assembly and said fixed frame or fixation section at a specified position that permits a line coupling together hinge portions at both ends of said link mechanism or link member, to pass through or adjacent to a center of gravity of said hard disk assembly; and
   a cable secured to an outside of said hard disk assembly and said fixed frame or fixation section for electrically connecting between said hard disk assembly and a terminal as provided at said fixed frame or fixation section, said cable extending from said hard disk assembly so as to go far from the center of gravity of said hard disk assembly while being bent for returning toward the center of gravity and is further bent at a portion adjacent to the center of gravity of said hard disk assembly.

2. A magnetic disk drive comprising:

a fixed frame or fixation section;

a holder supporting a hard disk assembly;

a commercially available general purpose hard disk assembly as held by said holder;

a link mechanism or link member between said holder and said fixed frame or fixation section at a specified position that permits a line coupling together hinge portions at both ends of said link mechanism or link member, to pass through or adjacent to a center of gravity of said hard disk assembly; and a cable secured to an outside of said hard disk assembly and said fixed frame or fixation section for electrically connecting between said hard disk assembly and a terminal as provided at said fixed frame or fixation section, said cable extending from said hard disk assembly so as to go far from the center of gravity of said hard disk assembly while being bent for returning toward the center of gravity and is further bent at a portion adjacent to the center of gravity of said hard disk assembly.

3. A magnetic disk drive comprising:

a fixed frame or fixation section for installation of more than two hard disk assemblies;

more than two hard disk assemblies held by said fixed frame or fixation section;

a link mechanism or link member between each said hard disk assembly and said fixed frame or fixation section supporting this assembly at a specified position that permits a line coupling together hinge portions at both ends of said link mechanism or link member, to pass through or adjacent to a center of gravity of said hard disk assembly; and a cable secured to an outside of each said hard disk assembly and said fixed frame or fixation section for electrically connecting between said hard disk assembly and a terminal as provided at said fixed frame or fixation section, said cable extending from said hard disk assembly so as to go far from the center of gravity of said hard disk assembly while being bent for returning toward the center of gravity and is further bent at a portion adjacent to the center of gravity of said hard disk assembly.

4. An electronic device comprising:

a drive bay;

a hard disk assembly held in said drive bay;

a link mechanism or link member between said hard disk assembly and said drive bay at a specified position that permits a line coupling together hinge portions at both ends of said link mechanism or link member, to pass through or adjacent to a center of gravity of said hard disk assembly; and a cable secured to an outside of said hard disk assembly and said drive bay for electrically connecting between said hard disk assembly and a terminal as provided at said drive bay, said cable extending from said hard disk assembly so as to go far from the center of gravity of said hard disk assembly while being bent for returning toward the center of gravity and is further bent at a portion adjacent to the center of gravity of said hard disk assembly.

5. The electronic device according to claim 4, wherein said drive bay is a drive bay for use with a magnetic disk drive of a specified type as selected from 3.5 inch type, 2.5 inch type or 1.8 inch type magnetic disk drive.

6. A magnetic disk drive comprising:

a fixed frame or fixation section;

a hard disk assembly supported in said fixed frame or fixation section;

a link mechanism or link member between said hard disk assembly and said fixed frame or fixation section at a specified position that permits a line coupling together hinge portions at both ends of said link mechanism or link member, to pass through or adjacent to a center of gravity of said hard disk assembly; and a cable secured to an outside of said hard disk assembly and said fixed frame or fixation section for electrically connecting between said hard disk assembly and a terminal as provided at said fixed frame or fixation section, said cable extending from said hard disk assembly so as to go far from the center of gravity of said hard disk assembly while being bent for return toward the center of gravity with a fold guide shape added thereto and is further bent a portion adjacent to the center of gravity of said hard disk assembly.

* * * * *